US 8,651,868 B2

(12) United States Patent
Kreiner et al.

(10) Patent No.: US 8,651,868 B2
(45) Date of Patent: *Feb. 18, 2014

(54) INTEGRATING REAL TIME DATA INTO VIRTUAL SETTINGS

(71) Applicant: AT&T Intellectual Property I, L.P., Atlanta, GA (US)

(72) Inventors: Barrett M. Kreiner, Woodstock, GA (US); Steven A. Wright, Roswell, GA (US); Christian Kuhtz, Roswell, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/687,089

(22) Filed: Nov. 28, 2012

(65) Prior Publication Data

US 2013/0084997 A1   Apr. 4, 2013

Related U.S. Application Data

(63) Continuation of application No. 13/565,829, filed on Aug. 3, 2012, now Pat. No. 8,366,446, which is a continuation of application No. 11/472,799, filed on Jun. 22, 2006, now Pat. No. 8,257,084.

(51) Int. Cl.
*G09B 9/04* (2006.01)

(52) U.S. Cl.
USPC ............................................................. 434/69

(58) Field of Classification Search
USPC .................................................... 434/29, 69
See application file for complete search history.

(56) References Cited

U.S. PATENT DOCUMENTS

| 5,926,179 | A | 7/1999 | Matsuda et al. |
|---|---|---|---|
| 5,942,969 | A | 8/1999 | Wicks |
| 6,139,433 | A | 10/2000 | Miyamoto et al. |
| 6,172,677 | B1 | 1/2001 | Stautner et al. |
| 6,215,498 | B1 | 4/2001 | Filo et al. |
| 6,315,668 | B1 | 11/2001 | Metke et al. |
| 6,320,495 | B1 | 11/2001 | Sporgis |
| 6,354,948 | B1 | 3/2002 | Nagayama |
| 6,527,641 | B1 | 3/2003 | Sinclair et al. |
| 6,795,084 | B2 | 9/2004 | Newman |
| 7,086,005 | B1 | 8/2006 | Matsuda |
| 7,265,663 | B2 | 9/2007 | Steele |
| 7,373,377 | B2 | 5/2008 | Altieri |
| 7,396,281 | B2 | 7/2008 | Mendelsohn et al. |
| 7,435,179 | B1 | 10/2008 | Ford |
| 7,464,337 | B2 | 12/2008 | Han et al. |
| 7,584,124 | B2 | 9/2009 | Porat et al. |
| 2002/0010025 | A1 | 1/2002 | Kelly et al. |
| 2002/0052724 | A1 | 5/2002 | Sheridan |

(Continued)

OTHER PUBLICATIONS

Bartlett et al, "Using Games as a Means for Collaboration", Proceedings of the 11th International Multimedia Modeling Conference, Jan. 12-13, 2005.

(Continued)

*Primary Examiner* — Robert J Utama
*Assistant Examiner* — Evan Page
(74) *Attorney, Agent, or Firm* — Scott P. Zimmerman, PLLC

(57) ABSTRACT

Data from live events is incorporated into virtual simulations and games. The data may be obtained from various sensors and transferred over a network. However, should one of the participants be a threat, then portions of the virtual simulations and games may be disabled to protect the other participants.

20 Claims, 3 Drawing Sheets

(56) References Cited

U.S. PATENT DOCUMENTS

| | | |
|---|---|---|
| 2002/0082065 A1 | 6/2002 | Fogel et al. |
| 2002/0090985 A1 | 7/2002 | Tochner et al. |
| 2002/0138587 A1 | 9/2002 | Koehler et al. |
| 2002/0184255 A1 | 12/2002 | Edd et al. |
| 2003/0055984 A1 | 3/2003 | Shimakawa et al. |
| 2003/0059005 A1 | 3/2003 | Meyerson et al. |
| 2003/0135493 A1 | 7/2003 | Phelan et al. |
| 2003/0177187 A1 | 9/2003 | Levine et al. |
| 2004/0044529 A1 | 3/2004 | Murakami |
| 2004/0109023 A1 | 6/2004 | Tsuchiya |
| 2004/0111479 A1 | 6/2004 | Borden et al. |
| 2004/0153557 A1 | 8/2004 | Shochet et al. |
| 2004/0219961 A1 | 11/2004 | Ellenby et al. |
| 2005/0004984 A1 | 1/2005 | Simpson |
| 2005/0004985 A1 | 1/2005 | Stochosky |
| 2005/0154574 A1 | 7/2005 | Takemura et al. |
| 2005/0207617 A1 | 9/2005 | Sarnoff |
| 2005/0267663 A1 | 12/2005 | Naono et al. |
| 2006/0045082 A1 | 3/2006 | Fertell et al. |
| 2006/0079330 A1 | 4/2006 | Dvorak et al. |
| 2006/0095262 A1 | 5/2006 | Danieli |
| 2006/0105838 A1 | 5/2006 | Mullen |
| 2007/0149286 A1 | 6/2007 | Bemmel |
| 2007/0260687 A1 | 11/2007 | Rao et al. |

OTHER PUBLICATIONS

Rashid et al, "Extending Cyberspace: Location Based Games Using Cellular Phones", ACM Computers in Entertainment, vol. 4, No. 1, Jan. 2006.

Tavares et al, "Hyperpresence-An Application Environment for Control of Multi-User Agents in Mixed reality Spaces", Proceedings of the $36^{th}$ Annual Simulation Symposium, Mar. 30-Apr. 2, 2003.

Blackhole Motorsports, www.bhmotorsports.com/NT2004/screenshots/7571, Sep. 23, 2003 (Date determined by WayBackMachine at www.archive.org), pp. 1-2.

"NBA Live 2003 review" by G. Varanini, Nov. 27, 2002, GameSpot, 3 pages.

Wadley et al, "Towards a Framework for Designing Speech-Based Player Interaction in Multiplayer Online Games", Proceedings of the $2^{nd}$ Australian Conference on Interactive Entertainment, Nov. 2005.

Halloran et al, "Does It Matter If You Don't Know Who's Talking? Multiplayer Gaming with Voiceover IP", Conference on Human Factors in Computing Systems, 2004.

INTEGRATING REAL TIME DATA INTO VIRTUAL SETTINGS

CROSS-REFERENCE TO RELATED APPLICATIONS

This application is a continuation of U.S. application Ser. No. 13/565,829, filed Aug. 3, 2012, now issued as U.S. Pat. No. 8,366,466, which is a continuation of U.S. application Ser. No. 11/472,799, filed Jun. 22, 2006, now issued as U.S. Pat. No. 8,257,084, with both applications incorporated herein by reference in their entireties.

BACKGROUND

This invention relates to simulation and more particularly to a method of implementing data into virtual settings.

Gaming devices are well known. Gaming can be viewed as a form of simulation. The early versions of games in a gaming device attached to a television monitor or played on a personal computer consisted of simple games like 'pong' in which a player played against the computer. As more powerful processors became available in personal computers, games having more complex features were developed. These games permitted participation by multiple players for example.

The more powerful processors also enabled the use of graphics within the games. Graphics provide a more elaborate background or user interface. Participants in some computer games or simulated sporting events (such as boxing for example) may be represented by a graphical representation so that a participant's action can be replicated or presented on the display. The effect of one participant's action on another participant may similarly be displayed. As a result, the gaming experience has become more realistic and personal.

The advent of networks has added another dimension to the gaming experience. It is now possible for participants at different physical locations to engage in a game over a network such as the internet for example. Thus, there is no longer a geographic limitation to the participants' locations. For example, they can be in the next room from one another or on different continents.

A game being played on a computing device is typically in the form of executable code on a computer-readable medium. The various scenarios encountered in a game are preprogrammed or programmed to respond in a pre-defined way to a particular action by a participant. As such, the scenarios are somewhat static in that they are limited to predictable participant actions.

There is thus a need for more dynamic gaming experience, incorporating real-time data into a virtual game on a computing device.

SUMMARY

In one embodiment, a method for providing substantially real-time data into a virtual setting comprises launching a simulation program on a computing device, receiving data gathered from a live event, accessing the data by the computing device and incorporating at least a portion of the accessed data into the simulation program.

In another embodiment, a computing device comprises communication means for receiving data gathered from a live event and processing means for executing a simulation program, accessing the received data and incorporating at least a portion of the accessed data into the simulation program.

In yet another embodiment, a computer-readable medium contains a computer program for providing substantially real-time data into a virtual setting. The computer program, when executed on a computing device, causes the computing device to launch a simulation program, receive data gathered from a live event, access the data and incorporate at least a portion of the accessed data into the simulation program.

BRIEF DESCRIPTION OF THE DRAWINGS

The various features, advantages, and objects of this invention will be understood by reading this description in conjunction with the drawings, in which.

DETAILED DESCRIPTION

The following description of the implementations according to exemplary embodiments refers to the accompanying drawings. The same reference numbers in different drawings identify the same or similar elements. The following detailed description does not limit the invention. Instead, the scope of the invention is defined by the appended claims.

According to exemplary embodiments, a simulated event executes on a computing device. Specifically, data from a real-time source such as a live event is made available to the simulated event being executed on the computing device.

As described above, games for execution on a computing device are typically developed or created and implemented as executable code on a computer-readable medium. The computer-readable medium may be a compact disc, for example. The various outcomes or scenarios encountered in the course of playing a game are pre-programmed or programmed to reflect a participant's actions. As such, the scenarios are somewhat static in that they are limited to predictable participant actions.

In a conventional computer game simulating a car race for example, virtually all aspects of the game besides a participant's actions are pre-programmed. Some aspects may be modelled after a real entity. The track may be modelled after the Indianapolis Motorway for example. Similarly, engine noise may be modelled after the noise from a particular make of car, etc.

While this may be of adequate challenge to a participant, especially during the initial use, repeated use or execution of the same game provides a measure of predictability to the participant. As a result, over a period of time, the game may become less interesting and less challenging.

Exemplary embodiments provide an advantage over conventional gaming systems by incorporating data from a real-life event (i.e. real-time data) into a game (or similar simulated activity) being played/used by one or more participants on a computing device. The data may be applied to the actions of at least one object that is part of the game or simulated activity. For example, data from a particular car in a real-life racing event may be applied to a car in an auto racing game. A player's participation in a real-life event may also be facilitated in other embodiments.

Figure 1:
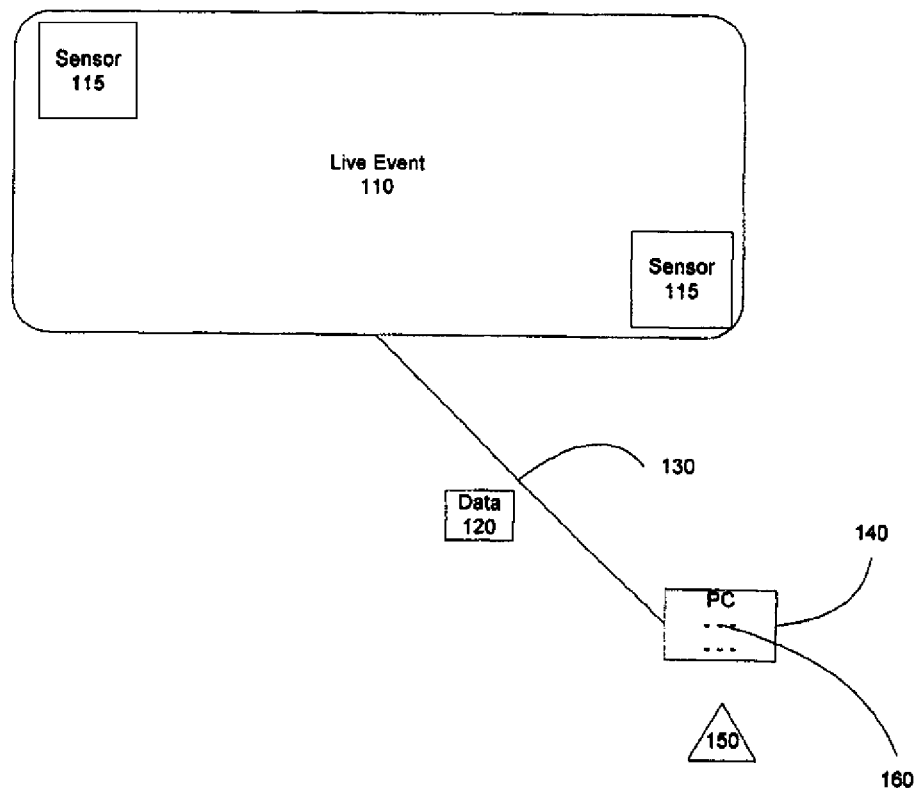
FIG. 1 illustrates a system according to an exemplary embodiment.

A system 100 according to an exemplary embodiment may be illustrated with reference to FIG. 1. A live event 110 may be taking place at a particular location. Referring to an auto racing event for example, the live event may be the Indianapolis 500 auto race taking place at the Indianapolis Motor Speedway in Indianapolis, Ind. Data 120 from this event may be made available over or may be communicated via a network 130. Network 130 may be the internet for example. A computing device 140, may have access (or connected) to network 130 for receiving data 120 from live event 110. Computing device 140 may be used by a participant (or participants) 150 for playing a computer game 160 such an auto racing game. Computing device may be a personal computer (PC) or a gaming console. The game may be displayed on a monitor.

Data 120 from the live event 110 may be obtained utilizing, for example, sensors 115 that may be placed around the speedway for example. Sensors may include, e.g., a plurality of video cameras. Sensors may also include, for example, a plurality of microphones for capturing sounds from a live audience. Data from the sensors may be collected at a central location at the live event 110 and fed to network 130 for delivery to computing device 150. Alternatively, data from the sensors may be fed directly to the network 130 for delivery in real time to the computing device 150. As yet another alternative, data collected from the sensors may be buffered and/or processed and then fed to the computing device 150 via network 130.

Figure 2:
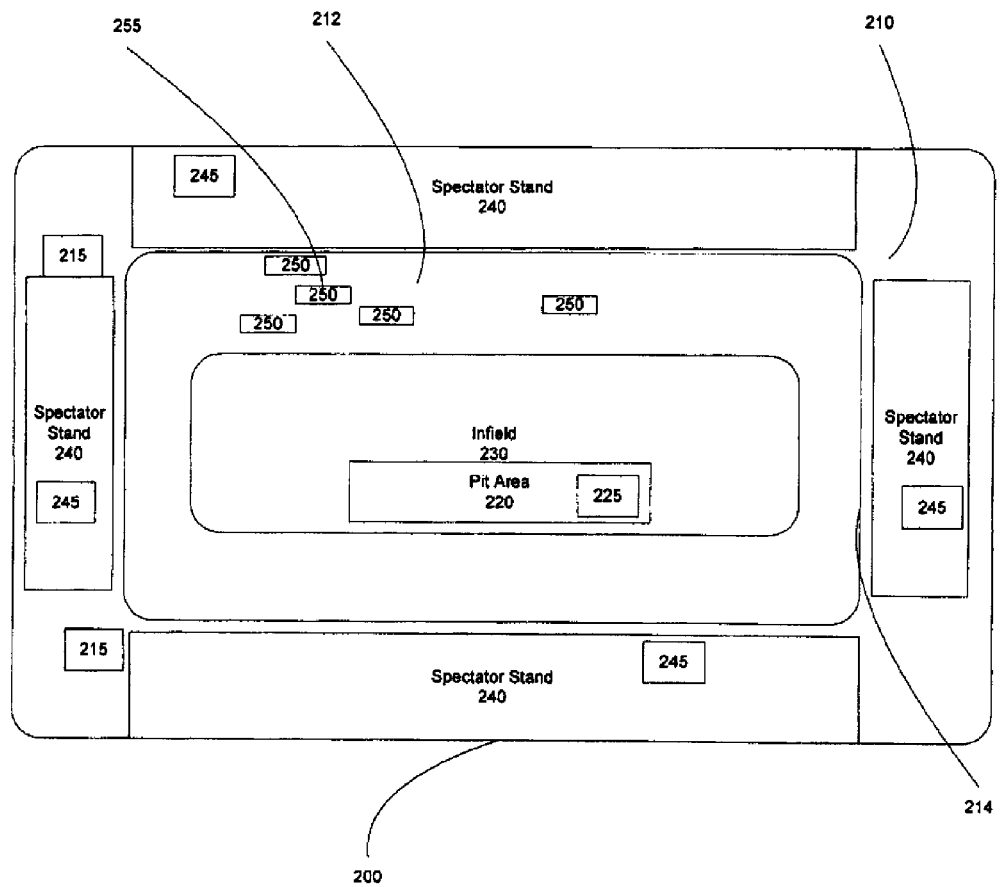
FIG. 2 illustrates an exemplary live event from which data may be collected.

Referring to FIG. 2, a speedway 200 may include track 210, pit areas 220 for repairing the vehicles during the race, an infield 230, a plurality of spectator stands (or audience seats, luxury boxes, etc.) 240 and a plurality of cars 250 competing in the race.

Sensors 215, such as a video camera, may be placed near the track to capture video footage of car movement on the track. They can be placed at the corners of the track to view the action in the straightaway 212 or side portions 214 of track 210. Microphones may also be placed along the tracks to capture the sounds of the vehicles as they pass by a microphone.

Similarly, sensors 225 may be placed in the pit areas 220 and sensors 245 may be placed at various locations within stands 240. Sensors 245 may capture sounds and activity within the stands. Sensors 225 may capture action within the pits as cars come in for repairs, tire changes, fuel, etc. Additional sensors such as for detecting or measuring temperature, wind speed/direction and other weather related conditions may also be utilized.

One or more of the cars 250 may also include sensors 255 for capturing data from the cars. The data may include a driver's view of the track and the surroundings. The data may also include a video image of the gauges facing the driver for example. The gauges may indicate fuel and other fluid levels, engine temperature, tire pressure, etc. The data may additionally include measurements of various parameters associated with or encountered by a car such as fuel level, wind speed, etc.

Data thus captured via the sensors 115 from live event 110 may be carried over fiber optic cables after the data has been converted to a suitable format for example and made available over network 130. Data that is collected may also be carried over via a wireless medium. Participant 150 may have access to network 130 over a high-speed connection such as via a cable modem or a DSL connection.

In some embodiments, data from the multiple sensors around speedway 200 may be collected and processed at a location 260 prior to being made available or transmitted over the network.

In playing a computer game 160 involving an auto race for example, data from one (or more) of the real cars 250 at speedway 200 may be associated with one (or more) of the virtual cars (also referred to as object or objects) within the game. The virtual car thus associated may then mimic the movement or actions of the real car within the game being played on the computer. Data may be incorporated into the game either at the game's server or the game's program on the local host. It may also be integrated at the computer running the game as an overlay.

Data obtained from the raceway may be used to control the operation of one of the cars 250 in the race in some embodiments. In this case, a real car 250 in the race may be driven by remote control. The actual driving may be accomplished by placing a robotic device that responds to remote commands from a participant 150 at a remote location. A participant may react based on data obtained from the race. In this scenario, commands for controlling a real car 250 from participant 150 may be submitted via network 130 to the corresponding car 250. Data from one of the real cars may be used by the participant to control that particular car. As technology evolves, the delay in transmitting data over some networks may be limited to below human perceptible levels.

In other embodiments, data collected by sensors 225 in the pits may be accessed by remotely located (i.e. not at the track) automotive technicians to observe condition of the cars from the remote location. The remote technician may (similar to participant 150) obtain data from a car at his or her computer 140. The remote technician may function as an additional observation source. In some scenarios, the remote technician may possess certain expertise missing from the technicians located in the pit. The observations, expertise or diagnosis may then be conveyed, via an audio communication medium (radio, cellular phone, etc.) for example, to technicians located in the pits to take a particular action. The medium of conveyance may also include an e-mail message or other type of electronic message such as a text message.

In some embodiments, the data from the event may provide an individual at a remote location a real-time virtual box seat to the action at the speedway for example. Static data from the speedway may be pre-loaded onto computing device 140. This data may represent the layout of the track, the seating arrangement, box seats, etc. Real-time data such as live sounds, views of the track with the race in progress from a particular location within the stands may be communicated dynamically as described above.

Figure 3:
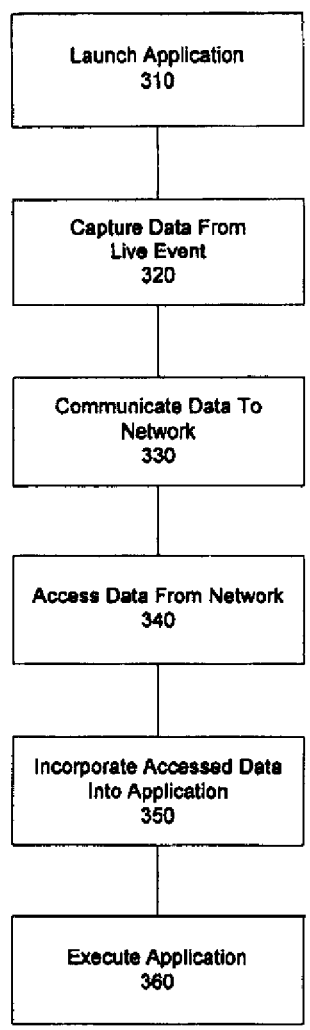
FIG. 3 illustrates an exemplary method for providing real-time data into a virtual setting.

An exemplary method 300 may be described with reference to FIG. 3. For ease of explanation, the steps described below are directed toward a gaming application. However, it should be appreciated that similar steps may be used for other types of simulated activities. A participant or player may launch a gaming application at 310. Data from one or more of sensors at a live event may be captured at 320. The captured data may be communicated to a network at 330. The data may be accessed from the network by a computing device associated with the participant at 340. At least a portion of the data may be incorporated into the gaming application 350. The participant may engage in playing the game at 360 with the data being dynamically incorporated into the gaming application.

In alternative embodiments, data from the event may be communicated to (and received by) the computing device and stored in the memory of the computing device. Such stored data may then be accessed by the computing device and incorporated into the gaming application.

A computer or a processor (at the live event) may facilitate the gathering of data, communication of data and processing of data in some embodiments. Communication between the motorway 200 (or, live event 110) and a gaming participant 140 may take place over a secure connection on a public network such as the internet or over a dedicated connection. Communication device 140 may have an identification such as an IP address or a phone number and data from live event 110 may be communicated to the computing device.

Exemplary embodiments can be within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions. As used here, a "computer-readable medium" can be any means that can contain, store, communicate, propagate, or transport the program for use by or in connection with the instruction-execution system, apparatus, or device. The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium include an electrical connection having one or more wires, a portable computer diskette, a random-access memory (RAM), a read-only memory (ROM), an erasable programmable read-only memory (EPROM or Flash memory), and an optical fiber.

It is expected that this invention can be implemented in a wide variety of environments. For example, principles of this invention can be used in training activities. Flight simulators can incorporate real-time data from a flight in progress.

It will also be appreciated that procedures described above are carried out repetitively as necessary. To facilitate understanding, aspects of the invention are described in terms of sequences of actions that can be performed by, for example, elements of a programmable computer system. It will be recognized that various actions could be performed by specialized circuits (e.g., discrete logic gates interconnected to perform a specialized function or application-specific integrated circuits), by program instructions executed by one or more processors, or by a combination of both.

It is emphasized that the terms "comprises" and "comprising", when used in this application, specify the presence of stated features, integers, steps, or components and do not preclude the presence or addition of one or more other features, integers, steps, components, or groups thereof.

Thus, this invention may be embodied in many different forms, not all of which are described above, and all such forms are contemplated to be within the scope of the invention. The particular embodiments described above are merely illustrative and should not be considered restrictive in any way. The scope of the invention is determined by the following claims, and all variations and equivalents that fall within the range of the claims are intended to be embraced therein.

The invention claimed is:

1. A method, comprising:
   establishing communication between a server executing a gaming simulation program and participant devices of the gaming simulation program;
   establishing a single voice channel between all the participants of the simulation program;
   retrieving data obtained from a sensor;
   incorporating the data into the gaming simulation program;
   retrieving profiles associated with the participant devices of the gaming simulation program;
   retrieving an indication from one of the profiles that one participant is a child predator; and
   disabling the voice channel in response to the indication of the child predator.

2. The method according to claim 1, wherein retrieving the data comprises retrieving the data from a camera.

3. The method according to claim 1, wherein retrieving the data comprises retrieving the data from a microphone.

4. The method according to claim 1, wherein retrieving the data comprises retrieving the data from a temperature sensor.

5. The method according to claim 1, wherein retrieving the data comprises retrieving the data from a fuel level sensor.

6. The method according to claim 1, further comprising correlating movements of an object in the gaming simulation program to the data.

7. The method according to claim 1, further comprising:
   pre-programming different audio noises in the gaming simulation promgram; and
   receiving a selection from one of the participant devices of one of the different audio noises.

8. The method according to claim 7, further comprising incorporating the selection as the data into the gaming simulation program.

9. A system, comprising:
   a processor; and
   memory storing code that when executed causes the processor to perform operations, the operations comprising:
   establishing communication between a server executing a gaming simulation program and participant devices of the gaming simulation program;
   establishing a single voice channel between all the participant devices of the simulation program;
   retrieving data obtained from a sensor;
   incorporating the data into the gaming simulation program;
   retrieving profiles associated with the participant devices of the gaming simulation program;
   retrieving an indication from one of the profiles that one participant is a child predator; and
   disabling the voice channel in response to the indication of the child predator.

10. The system according to claim 9, wherein the operations further comprise retrieving the data from a camera.

11. The system according to claim 9, wherein the operations further comprise retrieving the data from a microphone.

12. The system according to claim 9, wherein the operations further comprise retrieving the data from a temperature sensor.

13. The system according to claim 9, wherein the operations further comprise retrieving the data from a fuel level sensor.

14. The system according to claim 9, wherein the operations further comprise correlating movements of an object in the gaming simulation program to the data.

15. The system according to claim 9, wherein the operations further comprise:
   pre-programming different audio noises in the gaming simulation program; and
   receiving a selection from one of the participant devices of one of the different audio noises.

16. The system according to claim 15, wherein the operations further comprise incorporating the selection as the data into the gaming simulation program.

17. A memory storing code that when executed causes a processor to perform operations, the operations comprising:
   establishing communication between a server executing a gaming simulation program and participant devices of the gaming simulation program;
   establishing a single voice channel between all the participant devices of the simulation program;
   retrieving data obtained from a sensor;
   incorporating the data into the gaming simulation program;
   retrieving profiles associated with the participant devices of the gaming simulation program;

retrieving an indication from one of the profiles that one participant is a child predator; and disabling the voice channel in response to the indication of the child predator.

18. The memory according to claim 17, wherein the operations further comprise retrieving the data from a camera.

19. The memory according to claim 17, wherein the operations further comprise retrieving the data from a microphone.

20. The memory according to claim 17, wherein the operations further comprise retrieving the data from a temperature sensor.

* * * * *